Figure 1:
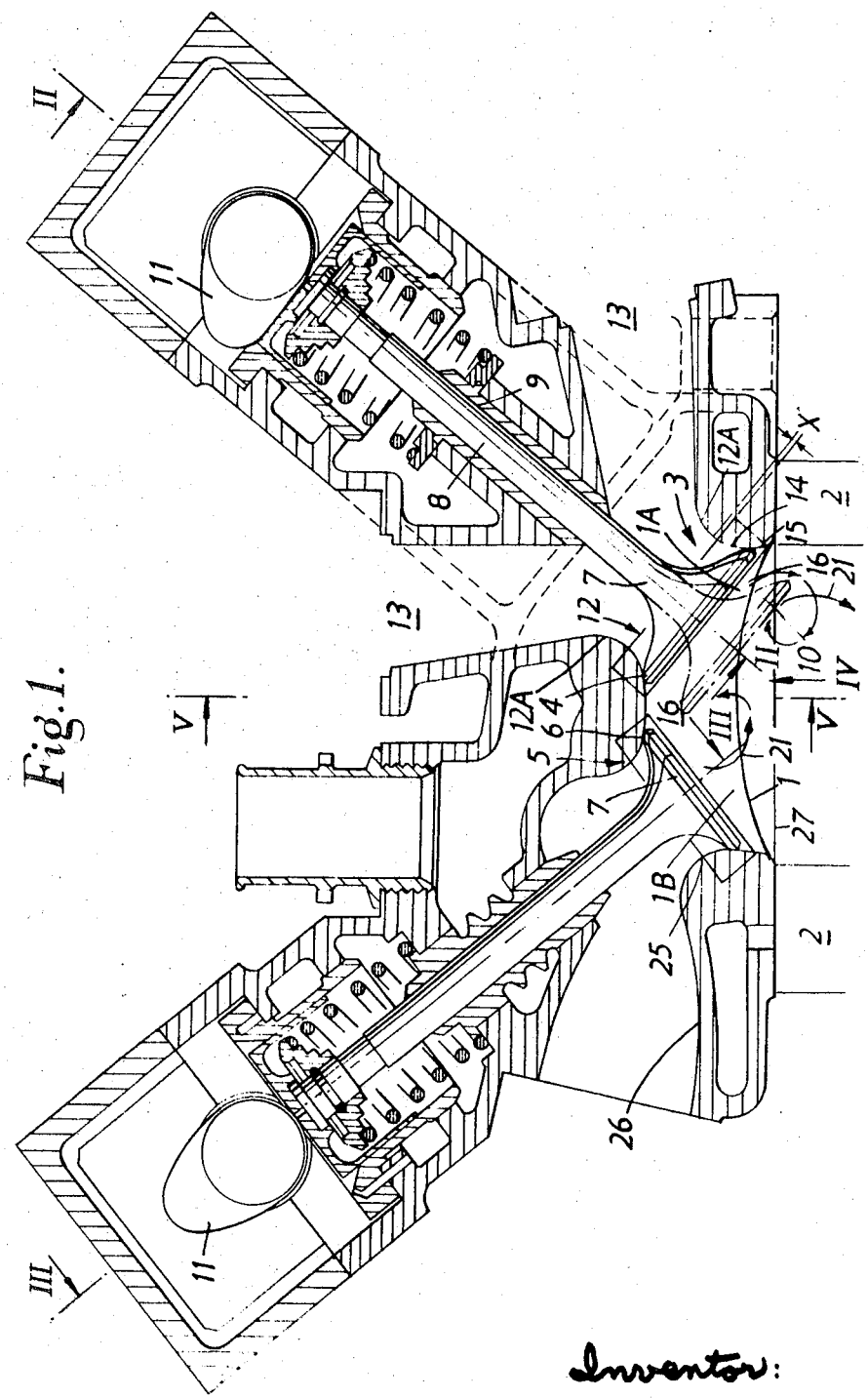

United States Patent

[11] 3,557,766

| [72] | Inventor | Frank H. Stark<br>Derby, England |
|---|---|---|
| [21] | Appl. No. | 735,398 |
| [22] | Filed | June 7, 1968 |
| [45] | Patented | Jan. 26, 1971 |
| [73] | Assignee | Leander Engineering Company Limited<br>Cardiff, Glamorganshire, Wales<br>a British Company |
| [32] | Priority | June 22, 1967 |
| [33] | | Great Britain |
| [31] | | 28,930 |

[54] COMBUSTION ENGINES
9 Claims, 5 Drawing Figs.

[52] U.S. Cl. ..................................................... 123/191,
123/188, 123/191
[51] Int. Cl. ..................................................... F02b 23/00
[50] Field of Search .......................................... 123/193H,
193CH, 188IM, 191(O)(T)

[56] References Cited
UNITED STATES PATENTS
| 1,531,298 | 3/1925 | Manville............... | 123/191(O) |
|---|---|---|---|
| 2,433,111 | 12/1947 | Gehres.................. | 123/191X(O) |
| 2,469,448 | 5/1949 | Barber.................. | 123/191X(O) |
| 2,576,819 | 11/1951 | Angle.................... | 123/193X(H) |
| 2,644,433 | 7/1953 | Anderson............. | 123/191(O) |
| 2,669,984 | 2/1954 | Marchall et al...... | 123/188(IM) |
| 2,692,591 | 10/1954 | Tatter................... | 123/191(O) |
| 2,804,862 | 9/1957 | Nedwidek............. | 123/191X(O) |
| 2,954,023 | 9/1960 | Lampredi............. | 123/191(O) |

FOREIGN PATENTS
| 433,559 | 9/1926 | Germany.............. | 123/193 |

*Primary Examiner*—Wendell E. Burns
*Attorney*—Karl W. Flocks

ABSTRACT: A cylinder head for an internal combustion engine comprising a boundary wall, preferably dished defining a combustion chamber at one end of the cylinder, the normal shape of the wall defining a chamber of insufficient size to accommodate movement of the poppet valve heads controlling the inlet and outlet ports, and the wall being provided with recesses in which the valve seats are located.

COMBUSTION ENGINES

This invention relates to internal combustion engines and cylinder heads therefor and in particular to the size of the combustion chamber and to the disposition and shape of gas passages for communication with the combustion chamber.

In a high compression internal combustion engine it is necessary to make the combustion chamber small in relation to the piston-swept volume of the associated cylinder.

It is important to obtain the correct flow pattern for gas from the induction system into the cylinder of an internal combustion engine and especially to avoid flow breakaway in the duct upstream of the valve head and to avoid forming a turbulent wake behind the valve stem.

It is an object of the present invention to provide an internal combustion engine and a cylinder head therefor, incorporating an improved combustion chamber with features to control the flow pattern of the incoming and exhaust gases.

Accordingly, in one aspect the invention provides a cylinder head for an internal combustion engine having a cylinder, the head part-spherical boundary wall to define a combustion chamber at one end of the cylinder, an inlet port and an outlet port each opening into the combustion chamber and each defined by an annular wall incorporating a valve seat located in respective inlet and outlet recesses in the boundary wall, the ports being controlled by respective inlet and outlet poppet valves each having a stem slidable in a valve guide and a head of a diameter greater than the corresponding one of a pair of contiguous chords contained in a single radial plane and respectively meeting the periphery of the boundary wall.

In another aspect a preferred form the invention provides a cylinder head for an internal combustion engine comprising a dished boundary wall defining a combustion chamber at one end of the cylinder, inlet and outlet recesses in the dished wall, an inlet port and an outlet port each opening into the combustion chamber and being defined by an annular wall forming a valve seat, an inlet and an outlet poppet valve controlling the inlet and outlet ports respectively and each having a head and a stem slidable in a valve guide, the curvature of the dished boundary wall without the recesses being such as not to allow the valve seat maximum diameters to be contained in chordal planes or to accommodate the valve heads in the combustion chamber in their maximum lift positions and the valve seats being located in the recesses.

Preferably the inlet recess, at least, is of sufficient depth to contain the inlet valve head in its maximum lift position. While the boundary wall is preferably dished apart from the recesses, it may alternatively be of such large radius, as to be substantially flat. The valves are preferably at an angle to the cylinder axis.

As shown, for example, in our British patent specification No. 971,211 a conventional combustion chamber is defined by a part spherical wall defining a cavity deep enough to accommodate valves of adequate size with their axes disposed at the required angle to the axis of the cylinder. The valve seats are on chords of the part spherical wall and large valves need a deep segmental cavity into which the piston crown must project in order to achieve the required volume of compression space, the resulting combustion chamber having numerous features which militate against the required pattern and speed of flame propagation and effective combustion of the charge.

With the combustion chamber of the present invention, the dome of the piston can be correspondingly reduced in height with a correspondingly reduced area to be exposed to the heat of the combustion flame and the subsequent hot gas and if so desired, can even be flat to achieve the minimum surface area to be exposed to the combustion flame.

Preferably the recesses have their minimum depths in the plane containing both valve centerlines and their maximum depths in planes normal to this plane.

Preferably a gas passage having a port of circular cross section coaxial with the inlet valve stem connects with the side of the inlet port remote from the combustion chamber. The passage may include two or more side tracts converging symmetrically into the passage port at the same angle and being arranged such that the combined momentum of converging gas streams entering the duct from the tracts is parallel with the valve axis to give uniform gas discharge through the valve opening and around the valve head periphery.

Preferably the inlet valve seat is formed by an outwardly diverging conical wall, extending beyond the valve seat towards the cylinder and at its outer and merging into a substantially cylindrical portion which extends to a point with the boundary wall of the combustion chamber, this point being preferably at least where the valve head reaches its maximum lift.

The uniform gas steam produced by the preferred form of gas passage, is discharged around the periphery of the valve, which causes the gas stream to be in part deflected inwards towards the valve centerline creating a toroidal vortex which is continually shed to establish a turbulence pattern within the cylinder. This pattern of turbulence has less tendency to deposit unvaporized fuel particles on the cylinder walls than the commonly used port-induced swirl or the highly directional flow from a conventional inlet port. In addition, the configuration of the recess about the inlet valve head in the region of its maximum lift position augments the establishment of the toroidal vortex pattern.

Preferably the inlet port recess includes a cylindrical portion which extends beyond the valve head in its maximum lift position and the exhaust port recess is extended in a similar manner.

Preferably the inner ends of the inlet port are joined into the passage port by curved surfaces. In the case where two tracts are provided these are normally arranged at opposite sides of the valve stem. It is preferred that the passage port duct is smaller in diameter than the minimum diameter of the port.

Figure 2:
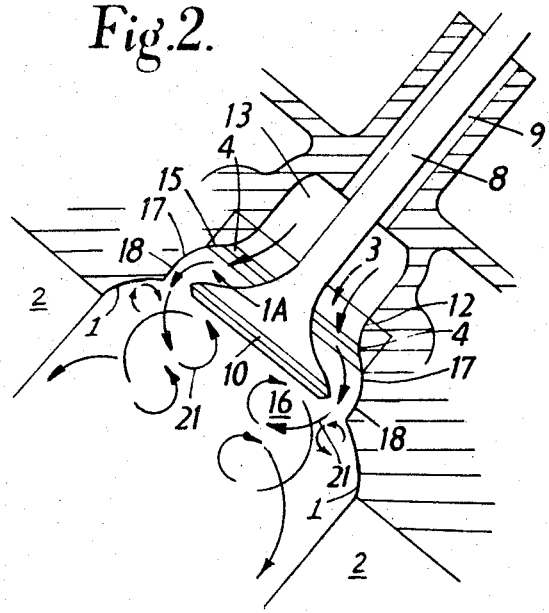
Figure 3:
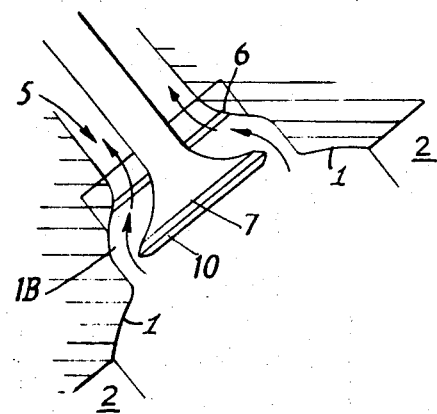
Figure 4:
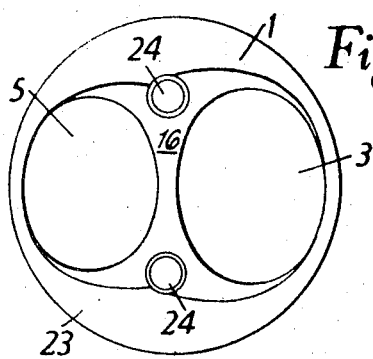
Figure 5:
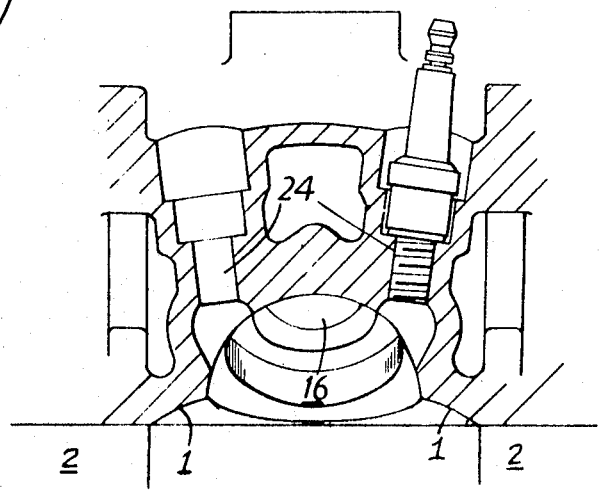

One embodiment of cylinder head for an internal combustion engine, in accordance with the invention, will now be described, by way of example only, with reference to the accompanying drawings of which:

FIG. 1 is a section through a cylinder head,
FIG. 2 is a section on the line II–II of FIG. 1,
FIG. 3 is a section on the line III–III of FIG. 1,
FIG. 4 is a view in the direction of arrow IV of FIG. 1, and
FIG. 5 is a section on the line V–V of FIG. 1.

A combustion chamber is defined by a part spherical boundary wall 1 at the head of an internal combustion engine cylinder.

The dimensions of the part spherical boundary wall 1 are such that inlet and outlet ports, and thus the heads of valves controlling the ports, of sufficient size for efficient flow of gases into and out of the chamber cannot be contained in chordal planes of the wall and the heads of the valves when lifted cannot be contained by the wall. Hence the wall 1 is formed with two recesses 1A, 1B which respectively lead to an inlet port 3 defined by a conical valve seat 4 and an exhaust port 5 defined by a conical valve seat 6. The ports 3 and 5 are governed by poppet valves 7, each valve having a stem 8 slidable in a valve guide 9 coaxial with its associated port, and a head 10 seatable in its respective valve seat 4, 6. The poppet valves are positively actuated by twin overhead cam mechanisms 11. The inlet port 3 on its side remote from the combustion chamber communicates with a gas passage having a port 12 of circular cross section whose diameter is smaller than the minimum diameter of the port 3. The passage port 12 blends at one end by means of curved surface 12A into a pair of inlet side tracts 13 disposed symmetrically on opposite sides of the stem and converging on the passage port 12 so that gas streams entering the passage port 12 from the side tracts are combined into a stream flowing parallel with the valve axis. At its other end the passage port 12 merges into the valve seat 4 by means of a curved surface 14 similar to the surface 12A. These two curved surfaces can be arranged to provide a single continuously curved surface extending from the side tracts 13 to the valve seat 4 or the surfaces may be separated by a cylindrical portion of length X. Some control of unvaporized fuel particles emerging from the tracts, and their corresponding distribution in the combined gas stream approaching the valve seat is possible by appropriately selecting the radius of curvature of the surfaces 12A. A large radius helps the particles to turn with the combined gas streams, while a small radius, and particularly a sharp corner, projects the particles towards the center of the passage port 12 so that some reach the valve stem or valve head. The curved surface 14 which connects the passage port 12 to the valve seat is important for its influence on the gas flow pattern where the stream passes between the valve head and the valve seat.

The recesses 1A, 1B have their minimum depths in the plane of FIG. 1 containing both valve centerlines and their maximum depths in the planes of FIGS. 2 and 3 respectively.

On the combustion chamber side, the inlet port 3 merges through the valve seat 4 and curved surface 15 into the recess 1A. As best seen in FIG. 2 the surface 15 merges into an oppositely curving blending surface 17 which in turn merges into a cylindrical wall portion 18, which defines an annular space about the valve head in the region of its maximum lift position. The cylindrical portion projects beyond the position occupied by the valve head at full valve lift before being merged into the wall 1. A working clearance is left between the piston at its top dead center position and the combustion chamber part spherical wall.

The arrows 21 show the resulting flow of gas around the valve head and the creation of a toroidal vortex turbulence pattern due to the unstreamlined flow around the valve head in its maximum lift position.

As seen in FIGS. 1 and 3 the recess 1B leading to the exhaust valve is of similar form to the recess 1B. The combustion space wholly or largely composed of such a geometrical shape is more compact than conventional arrangements and leaves an advantageously large area of the cylinder head internal profile to operate in conjunction with the piston top surface for the promotion of "squish" turbulence to the degree necessary to obtain the high rate of combustion flame propogation required at a very high engine speed. The extent of the "squish" area shown at 23 in FIG. 4 is defined by the part-spherical boundary wall 1.

Blending curved surfaces between the valve seat 6 and one end of a circular cross section gas passage part 25 and between the other end of the passage part 25 and an outlet side tract 26 are also provided on the side of the outlet port remote from the combustion chamber although the radii of the blending surfaces are kept as large as possible compatible with the longest passage port the cylinder head and valve gear layouts will permit.

FIG. 5 shows the arrangement of plugs 24 connected to the combustion space 16.

If it is desired to promote swirl of the charge in the cylinder, while preserving a symmetrical arrangement of the tracts 13 with respect to the inlet valve, that is the tracts 13 can be offset one to each side of the plane of FIG. 1 to provide a tangential component to the gas flow in the passage port and a resulting rotation of the flow emerging through the valve opening into the cylinder. However, a toroidal vortex pattern at the valve head will still be maintained.

In an alternative arrangement by the boundary wall 1 may be substantially flat as indicated at 27, that is the radius of curvature of the part-spherical wall 1 may be very large.

I claim:

1. An internal combustion engine having a cylinder head comprising a boundary wall defining a combustion chamber at one end of the cylinder, an inlet recess and an outlet recess in the boundary wall, an inlet port and an outlet each being defined by an annular wall forming a valve seat in the respective recess, an inlet and an outlet poppet valve controlling the inlet and outlet ports respectively and each having a head and stem slidable in a valve guide, at least the inlet recess being of sufficient depth to accommodate the inlet valve head in its maximum lift position.

2. A cylinder head according to claim 1 in which the valves have axes making an angle with the cylinder axis.

3. A cylinder head according to claim 1 in which the inlet port on its side remote from the combustion chamber connects with a gas passage having a part of circular cross section coaxial with the inlet valve stem and of a smaller cross section area than the inlet port.

4. A cylinder head according to claim 3 in which the gas passage includes at least two side tracts converging symmetrically into the circular cross section part such that the combined momentum of converging gas streams entering the part from the tracts is parallel with the valve stem.

5. A cylinder head according to claim 4 in which the circular cross section part has smoothly outwardly diverging wall surfaces which merge smoothly with the inlet valve seat and the side tracts, respectively.

6. A cylinder head according to claim 1 in which the inlet valve seat on its side adjacent the combustion chamber, merges smoothly into an outwardly diverging wall portion of the inlet recess.

7. A cylinder head according to claim 6 in which the outwardly diverging wall portions merge smoothly into a substantially cylindrical wall portion of the inlet recess.

8. A cylinder head according to claim 7 in which the substantially cylindrical wall portion extends from the valve seat at least to the maximum lift position of the inlet valve head.

9. A cylinder head according to claim 8 in which the outlet recess is similarly shaped to the inlet recess.